United States Patent
Breton et al.

(10) Patent No.: US 9,676,952 B2
(45) Date of Patent: Jun. 13, 2017

(54) 3D PRINTING SYSTEM COMPRISING SOLID BUILD INK COMPRISING COLORANT

(71) Applicant: XEROX CORPORATION, Norwalk, CT (US)

(72) Inventors: Marcel P. Breton, Mississauga (CA); Jennifer L. Belelie, Oakville (CA); Michelle N. Chretien, Mississauga (CA); Naveen Chopra, Oakville (CA); Barkev Keoshkerian, Thornhill (CA)

(73) Assignee: XEROX CORPORATION, Norwalk, CT (US)

( * ) Notice: Subject to any disclaimer, the term of this patent is extended or adjusted under 35 U.S.C. 154(b) by 163 days.

(21) Appl. No.: 14/630,629

(22) Filed: Feb. 24, 2015

(65) Prior Publication Data

US 2016/0244628 A1    Aug. 25, 2016

(51) Int. Cl.
| | |
|---|---|
| *B29C 67/00* | (2017.01) |
| *B29K 33/00* | (2006.01) |
| *B29K 105/00* | (2006.01) |
| *B33Y 10/00* | (2015.01) |
| *B33Y 70/00* | (2015.01) |
| *B33Y 80/00* | (2015.01) |
| *C09D 11/34* | (2014.01) |
| *C09D 11/101* | (2014.01) |

(52) U.S. Cl.
CPC .......... *C09D 11/34* (2013.01); *B29C 67/0059* (2013.01); *B29C 67/0092* (2013.01); *B33Y 70/00* (2014.12); *C09D 11/101* (2013.01); *B29K 2033/08* (2013.01); *B29K 2105/0032* (2013.01); *B33Y 10/00* (2014.12); *B33Y 80/00* (2014.12)

(58) Field of Classification Search
CPC . B29C 67/0092; B29C 67/0059; B33Y 70/00; B33Y 10/00; B33Y 80/00; B29K 2033/08; B29K 2105/0032; C09D 11/34; C09D 11/101; C09D 11/01
See application file for complete search history.

(56) References Cited

U.S. PATENT DOCUMENTS

| | | | |
|---|---|---|---|
| 5,782,966 A * | 7/1998 | Bui ..................... | C08G 18/2815 101/491 |
| 2010/0055484 A1* | 3/2010 | Chretien .............. | C09D 11/101 428/484.1 |
| 2012/0287212 A1* | 11/2012 | Chretien ................ | C09D 11/34 347/102 |
| 2013/0236706 A1 | 9/2013 | Xu et al. | |

* cited by examiner

*Primary Examiner* — Patrick Niland
(74) *Attorney, Agent, or Firm* — Pillsbury Winthrop Shaw Pittman LLP

(57) ABSTRACT

A color three-dimensional (3D) printing system includes (1) a solid build ink for each of a plurality of colors, each solid build ink includes (a) a solid acrylate in an amount from about 40 to about 70 percent by weight, (b) a non-curable wax in an amount from about 10 to about 45 percent by weight, (c) a curable wax in an amount from about 1 to about 15 percent by weight, (d) a photoinitiator, and (e) a colorant; each solid build ink has a curing speed adjusted by a ratio of the non-curable wax to curable wax such that the initial curing speed and final hardness of each solid build ink is approximately the same for each of the plurality of colors, and (2) a support material includes the non-curable wax used in each build ink, the support material providing a scaffold for deposition of each build ink.

19 Claims, 3 Drawing Sheets

3D PRINTING SYSTEM COMPRISING SOLID BUILD INK COMPRISING COLORANT

BACKGROUND

The present disclosure relates to three-dimensional printing. In particular, the present disclosure relates to three-dimensional printing employing UV curable solid inks capable of carrying diverse colorants.

Three-dimensional (3D) printers are becoming increasingly popular in home and professional applications. There are many advantages to using 3D printers, including quicker, more economical and high throughput prototype evaluation. 3D printers currently offer a number of solutions for selective deposition modeling for professional use.

A typical printing system applies a UV curable hot melt material to a non-curable wax support via inkjet. Each layer, typically microns in size, is cured after deposition. When the fabrication is complete, the support material is washed, melted or blasted away, depending on its composition, leaving the 3D fabrication. The UV curable materials are available in a wide variety of physical characteristics (e.g., tensile strength, tensile modulus, flexural strength, and the like), but in a limited number of colors, and using different colors presents a particular challenge due to differing rates of curing and final curing hardness value which may preclude printing articles with multiple colors.

SUMMARY

In some aspects, embodiments herein provide color three-dimensional (3D) printing systems comprising (1) a solid build ink for each of a plurality of colors, each solid build ink comprising (a) a solid acrylate in an amount from about 40 to about 70 percent by weight, (b) a non-curable wax in an amount from about 10 to about 45 percent by weight, (c) a curable wax in an amount from about 1 to about 15 percent by weight, (d) a photoinitiator, and (e) a colorant, wherein each solid build ink has a curing speed adjusted by a ratio of the non-curable wax to curable wax such that the initial curing speed and final hardness of each solid build ink is approximately the same for each of the plurality of colors, and (2) a support material comprising the non-curable wax used in each build ink, the support material providing a scaffold for deposition of each build ink.

In some aspects, embodiments herein provide methods of color 3D printing a three-dimensional article comprising (1) providing a solid build ink for each of a plurality of colors, each solid build ink comprising (a) a solid acrylate in an amount from about 40 to about 70 percent by weight, (b) a non-curable wax in an amount from about 10 to about 45 percent by weight, (c) a curable wax in an amount from about 1 to about 15 percent by weight, (d) a photoinitiator, and (e) a colorant, wherein each solid build ink has a curing speed adjusted by a ratio of the non-curable wax to curable wax such that the curing speed and final hardness of each solid build ink is approximately the same for each of the plurality of colors, (2) providing a support material comprising the non-curable wax used in each build ink, the support material providing one or more scaffold layers for deposition of at least one solid build ink layer as dictated by the geometry of the three-dimensional article, (3) depositing one or more solid build inks in a plurality of build ink layers to form the three-dimensional article on a substrate, each deposited build ink layer of the plurality of build ink layers being disposed on (a) the substrate, (b) a portion of a previous solid build ink layer, (c) a portion of the one or more scaffold layers, or (d) combinations thereof, (4) depositing the support material in the one or more scaffold layers, each deposited scaffold layer being disposed on (a) the substrate, (b) a portion of a previous solid build ink layer, (c) a portion of the one or more scaffold layers, or (d) combinations thereof, and (5) curing each of the plurality of build ink layers to form the three-dimensional article.

In some aspects, embodiments herein provide sets of solid build inks for use in color three-dimensional printing, each of the set of solid build inks comprising a solid acrylate in an amount from about 40 to about 70 percent by weight, a non-curable wax in an amount from about 10 to about 45 percent by weight a curable wax in an amount from about 1 to about 15 percent by weight; a photoinitiator; and a colorant, wherein each solid build ink in the set has a different colorant and has a curing speed adjusted by a ratio of the non-curable wax to curable wax such that the curing speed and final hardness of each solid build ink is substantially the same independent of the colorant in a given solid build ink.

BRIEF DESCRIPTION OF DRAWINGS

Various embodiments of the present disclosure will be described herein below with reference to the figures wherein.

DETAILED DESCRIPTION

Figure 1:
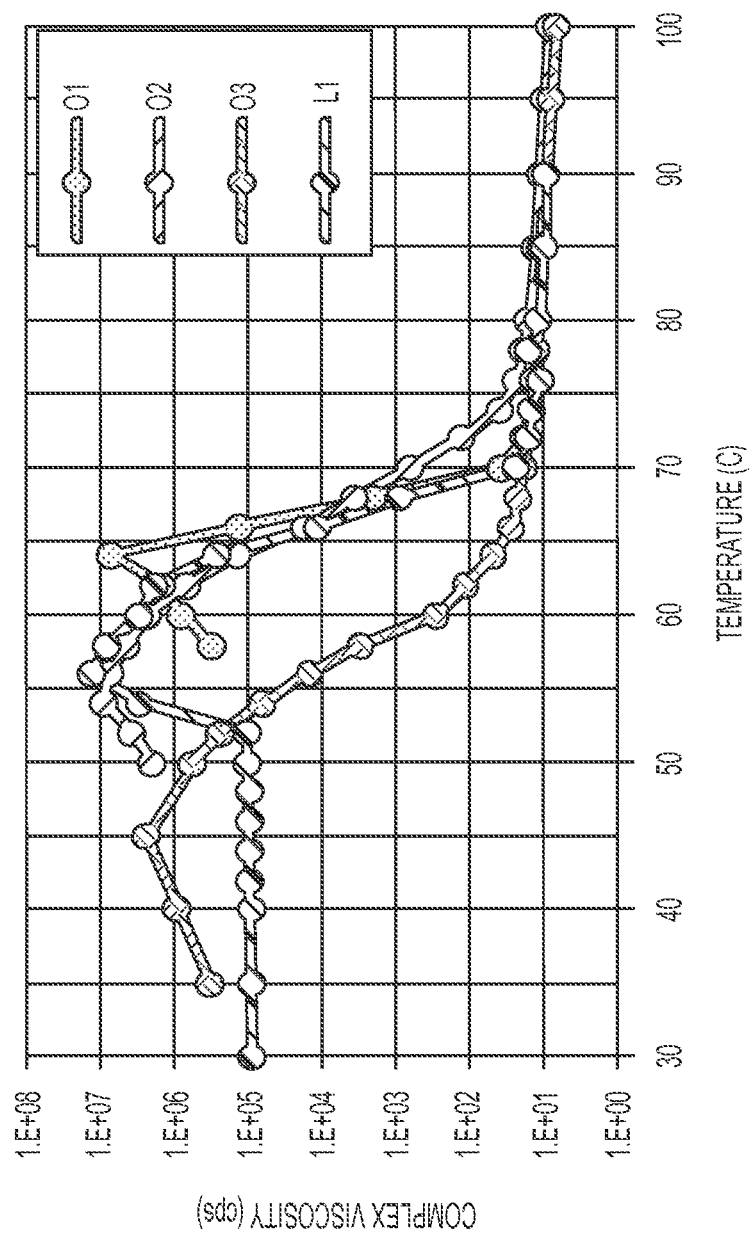
FIG. 1 shows a plot of complex viscosity versus temperature for exemplary cyan solid build inks, in accordance with embodiments herein.

Embodiments herein provide conditions for a set of solid build inks for use in three-dimensional printing. The solid build inks are UV curable inks (no liquid components) and are readily tailored to fit the specifications for compatibility with current three-dimensional inkjet printing systems. The solid build inks offer many advantages over conventional UV curable build inks known in the art, such as those based on urethane resin and wax systems described, for example, in U.S. Pat. Nos. 7,378,460 and 6,841,589.

The solid build inks disclosed herein are designed for easy colorant incorporation to provide a wide variety of colors and the ability to print layers from about 10 microns up to about 5 mm in thickness before curing. In particular, the solid build inks are flexible in design to account for differences in initial hardness and cure rates such that each color of a set of solid build inks can be modified to synchronize cure times and final hardness thereby avoiding potential issues with uneven shrinkage and cure rates across different colors.

In the selective deposition methods disclosed herein, a curable solid build ink may be jetted onto a non-curable wax support material; optionally this non-curable wax may be a variant of the curable solid ink without photoinitiator(s). Although typically the supporting wax will be the same wax that is used to formulate the solid build ink for economy of material and methodology, there is no strict requirement that they be the same. Each layer is cured after each deposition or alternatively after multiple passes or in some embodiments, the cure occurs only once the full three-dimensional object has been fabricated. When the fabrication is complete, the support material may be washed, melted or blasted away from the 3D fabrication, depending on the composition of the support material.

The UV curable solid build inks disclosed herein may generally have the following properties when employed in conjunction with jet printing systems: (1) they are jettable with a viscosity of about 8 to about 16 cps at temperatures between about 70° C. and 95° C.; (2) they are soft solids at temperatures below about 30° C. prior to curing; and (3) they exhibit high curing rates upon exposure to UV irradiation.

In embodiments, all of the solid build ink components (i.e., monomers, photoinitiators, and the like) are solid at ambient temperature. These solid build inks have the added advantage of being easily pigmented and their phase change properties make them suitable for printing on virtually any substrate, including, porous support materials. Additionally, as mentioned above, the solid build inks can be printed in one pass to the desired 3D dimension without intervening printing/curing steps in conventional 3D processes. These and other advantages will be apparent to those skilled in the art.

In embodiments, there are provided color 3D printing systems comprising a solid build ink for each of a plurality of colors, each solid build ink comprising a solid acrylate in an amount from about 55 to about 95 percent by weight, a non-curable wax in an amount from about 5 to about 45 percent, a curable wax in an amount from about 0.1 to about 30 percent, a photoinitiator; and a colorant, wherein each solid build ink has a curing speed adjusted by a ratio of the non-curable wax to curable wax such that the curing speed and final hardness of each solid build ink is approximately the same for each of the plurality of colors, the systems further comprising a support material comprising the non-curable wax used in each build ink, the support material providing a scaffold for deposition of each build ink. The support material is generally built up via the same printing mechanism by which the solid build ink is deposited.

The present embodiments provide low energy ultraviolet (UV) curable pigmented solid build inks with high reactivity and minimum shrinkage for application in three-dimensional printing. These solid build inks may optionally contain a gellant additive and may be formulated with viscosities in the range of less than 20 cPs at 90° C., or from about 20 to about 5 cPS at 90° C., or from about 15 to about 8 cPs at 90° C., and a shrinkage value of less than 3%, or from about 1 to about 3%. As used herein, the shrinkage value indicates the shrinkage of the ink upon cooling from a liquid state. In addition, these inks exhibit a hardness after curing much higher than conventional solid inks, such as those commercially available from Xerox Corporation or Océ North America. Tuneability in curing rate and final hardness after curing was also shown for these solid build inks as well as improved compatibility between components upon solidification. Curing rates can be obtained by plotting the hardness versus duration of exposure to UV light in ft/s (feet per second) (Fusions UV doped mercury D-bulb, 600 W/cm) and applying the following expressions:

$y = m_1 + m_2 \cdot (1 - \exp(-m_3 \cdot x))$

Initial Hardness = $m_1$

Initial Slope = $m_2 \cdot m_3$

Final Hardness = $m_1 + m_2$ where the initial slope is taken as the initial curing rate. The solid build inks herein may display curing rates from about 130 to about 250 ft/s, such as from about 180 to about 250 ft/s or from about 200 to about 250 ft/s. Depending on the type of bulb used in the UV curable lamp, the characteristic output used for curing may be from about 200 nm to about 450 nm.

The solid build inks may comprise blends of curable waxes, non-curable waxes, monomers, optional gellants, colorants, and free-radical photoinitiators, and optionally up to 5 percent by weight of non-curable resins, such as viscosity modifiers. The various components are solid materials below about 40° C., or from below about 40° C. to below about 30° C. These components were selected to achieve jetting at temperatures in the range of from about 70° C. to about 100° C., or from about 80° C. to about 100° C., or from about 70° C. to about 90° C. These solid build inks thus have robust jetting at elevated temperatures with a viscosity of from about 5 to about 15 cPs, or from about 10 to about 15 cPs, or from about 8 to about 12 cPs at these temperatures, and are solid at room temperature which prevents excessive spreading or migration of the printed droplet on, for example, porous substrates. After printing one or more layers in the construction of a three-dimensional article, the compositions are cured to provide robust articles.

The curable solid build inks may have a pre-cured hardness of from about 0.1 to about 50 or of from about 5 to about 50, or of from about 10 to about 50. These inks may have a post-cured hardness of from about 70 to about 100, or of from about 80 to about 97, or of from about 80 to about 95. One skilled in the art will recognize that these are Shore Durometer hardness values and that durometer values are dimensionless quantities.

The curable solid build ink components may include monomers, curable waxes and optionally gellants. The curable wax may be a solid at room temperature (about 25° C.). Inclusion of the wax may promote an increase in viscosity of the solid build ink as the composition cools from the application temperature. The curable wax may be any wax component that is miscible with the other components and that will polymerize to form a polymer. The term wax includes, for example, any of the various natural, modified natural, and synthetic materials commonly referred to as waxes.

Suitable examples of curable waxes include waxes that include or are functionalized with curable groups. The curable groups may include, for example, an acrylate, methacrylate, alkene, allylic ether, epoxide, oxetane, and the like. These waxes can be synthesized by the reaction of a wax, such as a polyethylene wax equipped with a carboxylic acid or hydroxyl transformable functional group. The curable waxes described herein may be cured with the above isosorbide functionalized with at least one curable group and/or the additional curable monomer(s).

Suitable examples of hydroxyl-terminated polyethylene waxes that may be functionalized with a curable group include mixtures of carbon chains with the structure $CH_3$—$(CH_2)_n$—$CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN series of materials such as UNILIN 350, UNILIN 425, UNILIN 550 and UNILIN 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

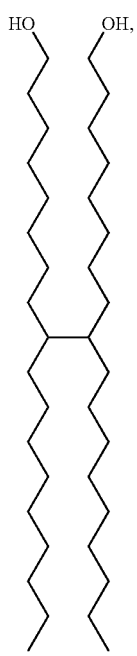 [SMILES: CCCCCCCCCC(CCCCCCCCO)C(CCCCCCCCC)CCCCCCCCO]

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4$^{th}$ Ed. (1992), pp. 223-237, the disclosure of which is totally incorporated herein by reference, may also be used. These alcohols can be reacted with carboxylic acids equipped with UV curable moieties to form reactive esters. Examples of these acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3-(CH_2)_n-COOH$, where there is a mixture of chain lengths, n, where the average chain length is about 16 to about 50, and linear low molecular weight polyethylene, of similar average chain length. Suitable examples of such waxes include UNICID® 350, UNICID® 425, UNICID® 550 and UNICID® 700 with $M_n$ equal to approximately 390, 475, 565 and 720 g/mol, respectively. Other suitable waxes have a structure $CH_3-(CH_2)_n-COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds.

Exemplary Guerbet acids include those containing 16 to 36 carbons, many of which are commercially available from Jarchem Industries Inc., Newark, N.J. PRIPOL® 1009 (C-36 dimer acid mixture including isomers of the formula

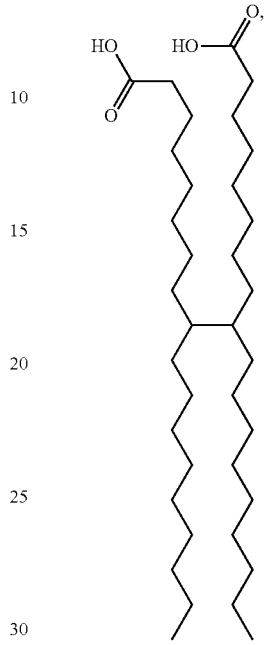

as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4$^{th}$ Ed. (1992), pp. 223-237, the disclosure of which is totally incorporated herein by reference, can also be used. These carboxylic acids can be reacted with alcohols equipped with UV curable moieties to form reactive esters. Examples of these alcohols include, but are not limited to, 2-allyloxyethanol from Sigma-Aldrich Co.;

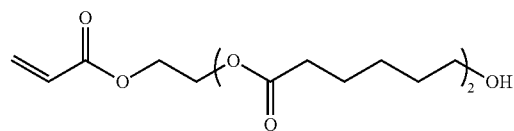 [SMILES: C=CC(=O)OCCOC(=O)CCCCCO]

SR495B from Sartomer Company, Inc. (Exton, Pa.); and

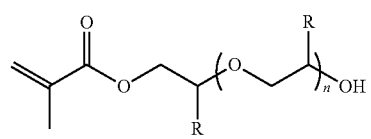

CD572 (R=H, n=10) and SR604 (R=Me, n=4) from Sartomer Company, Inc.

The curable wax can be included in the solid build inks in an amount of from, for example, about 0.1% to about 30% by weight of the composition, such as from about 0.5% to about 20% or from about 0.5% to 15% by weight of the composition.

The monomers that may be used in the present embodiments are, in embodiments, those described in U.S. Pat. No. 7,559,639, which is hereby incorporated by reference. For example, the monomer may be a dimethanol diacrylate cyclohexane difunctional monomer, such as for example, CD-406 from Sartomer (mp=78° C.); an isocyanurate triacrylate trifunctional monomer, such as for example, SR-368 from Sartomer (mp=50-55° C.); a behenyl acrylate monofunctional mionomer C18,C20,C22 mixture, such as for example, CD587 from Sartomer (mp=55° C.); an acrylate curable monofunctional acrylate wax C22,C23,C24 mixture, such as for example, UNILIN 350 from Baker Petrolite (Houston, Tex.) (mp=78-83° C.); and optionally a curable amide gellant.

The optional gellants suitable for use in the radiation curable solid build ink may include a gellant comprised of a curable amide, a curable polyamide-epoxy acrylate component, a polyamide component, mixtures thereof and the like. In further embodiments, a curable composite gellant may be comprised of a curable epoxy resin and a polyamide resin, mixtures thereof and the like. The gellant may also participate in the curing of monomer(s) in the composition. The gellants suitable for use in the solid inks may be amphiphilic in nature in order to improve wetting when the ink composition is utilized over a substrate having silicone or other oil thereon. Amphiphilic refers to molecules that have both polar and non-polar parts of the molecule. For example, the gellants may have long non-polar hydrocarbon chains and polar amide linkages.

Amide gellants suitable for use include those described in U.S. Patent Application Publication No. 2008/0122914 and U.S. Pat. Nos. 7,276,614 and 7,279,587, the entire disclosures of which are incorporated herein by reference. However, unlike the present embodiments, which are solid curable inks at room temperature both in the presence and absence of a gellant, the above patents are directed to liquid curable inks. In specific embodiments, the gellant is a mixture of components that also includes both curable and non-curable gellants.

In embodiments, the solid build inks are formulated with a gellant material. Gellants suitable for use in the ink compositions include a gellant comprised of a curable amide, a curable polyamide-epoxy acrylate component and a polyamide component, a curable composite gellant comprised of a curable epoxy resin and a polyamide resin, mixtures thereof and the like, as disclosed in U.S. patent application Ser. No. 12/474,946, which is hereby incorporated herein by reference in its entirety. The gellant may also participate in the curing of monomer(s) of the composition.

The gellants suitable for use in the solid build ink may be amphiphilic in nature in order to improve wetting when the composition is utilized over a substrate having silicone or other oil thereon. Amphiphilic refers to molecules that have both polar and non-polar parts of the molecule. For example, the gellants may have long non-polar hydrocarbon chains and polar amide linkages. Amide gellants suitable for use include those described in U.S. Patent Application Publication No. 2008/0122914 and U.S. Pat. Nos. 7,276,614 and 7,279,587, the entire disclosures of which are incorporated herein by reference. Additional gellants suitable for use also include those described in U.S. patent application Ser. No. 12/765,148 to Chopra et al. filed on Apr. 22, 2010. As described in U.S. Pat. No. 7,279,587, the amide gellant may be a compound of the formula

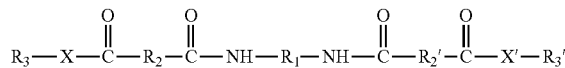

wherein:
R$_1$ is:
(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about 1 carbon atom to about 8 carbon atoms or from about 1 carbon atom to about 5 carbon atoms,
(ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms,
(iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, or
(iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms,
wherein the substituents on the substituted alkylene, arylene, arylalkylene, and alkylarylene groups can be halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;
R$_2$ and R$_2$' each, independently of the other, are:
(i) alkylene groups having from about 1 carbon atom to about 54 carbon atoms, such as from about 1 carbon atom to about 48 carbon atoms or from about 1 carbon atom to about 36 carbon atoms, (ii) arylene groups having from about 5 carbon atoms to about 15 carbon atoms, such as from about 5 carbon atoms to about 13 carbon atoms or from about 5 carbon atoms to about 10 carbon atoms, (iii) arylalkylene groups having from about 6 carbon atoms to about 32 carbon atoms, such as from about 7 carbon atoms to about 33 carbon atoms or from about 8 carbon atoms to about 15 carbon atoms, or (iv) alkylarylene groups having from about 6 carbon atoms to about 32 carbon atoms, such as from about 6 carbon atoms to about 22 carbon atoms or from about 7 carbon atoms to about 15 carbon atoms, wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring; $R_3$ and $R_3'$ each, independently of the other, are either:

(a) photoinitiating groups, such as groups derived from 1-(4-(2-hydroxyethoxy)phenyl)-2-hydroxy-2-methyl-propan-1-one, of the formula

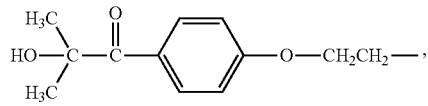

groups derived from 1-hydroxycyclohexylphenylketone, of the formula

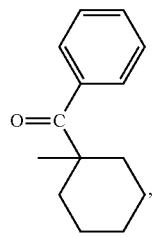

groups derived from 2-hydroxy-2-methyl-1-phenylpropan-1-one, of the formula

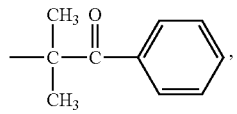

groups derived from N,N-dimethylethanolamine or N,N-dimethylethylenediamine, of the formula

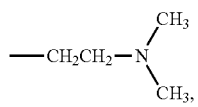

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms, (ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, such as tolyl or the like, wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring; and X and X' each, independently of the other, is an oxygen atom or a group of the formula —$NR_4$—, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms, (iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms, (iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms, wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Specific suitable substitents and gellants of the above are further set forth in U.S. Pat. Nos. 7,279,587 and 7,276,614, incorporated herein by reference in their entireties. In embodiments, the gellant may comprise a mixture comprising:

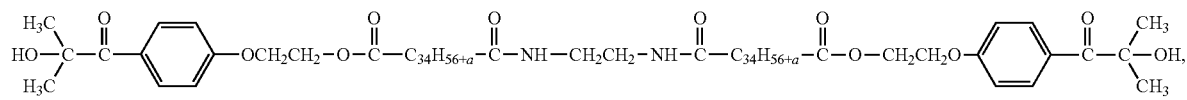

(I)

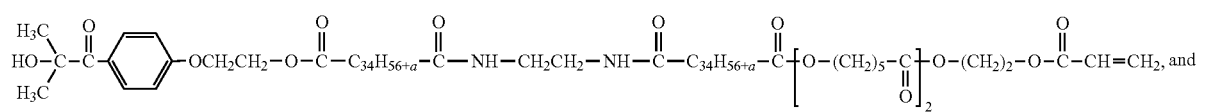

(II)

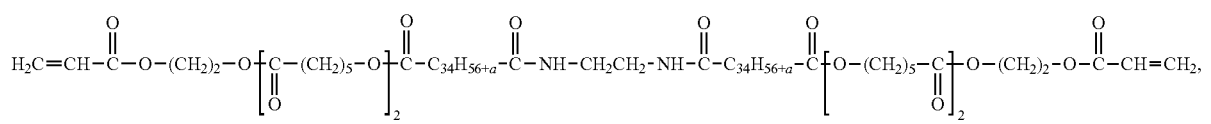

(III)

wherein —C$_{34}$H$_{56+a}$— represents a branched alkylene group which may include unsaturations and cyclic groups, wherein the variable "a" is an integer from 0-12.

In embodiments, the gellant may be one of the aromatic end-capped gellants described in U.S. patent application Ser. No. 12/765,148 to Chopra et al. filed on Apr. 22, 2010, which is hereby incorporated by reference in its entirety. In embodiments, the gellants of the ink may be compounds with the following general structures

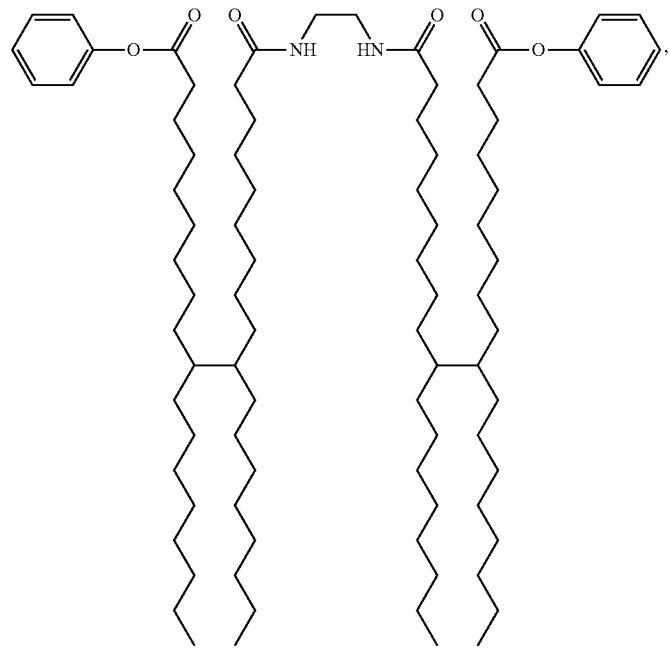

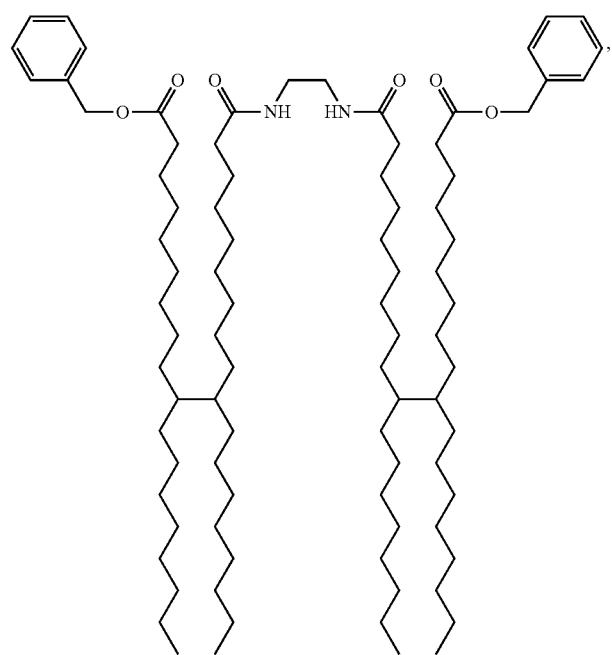

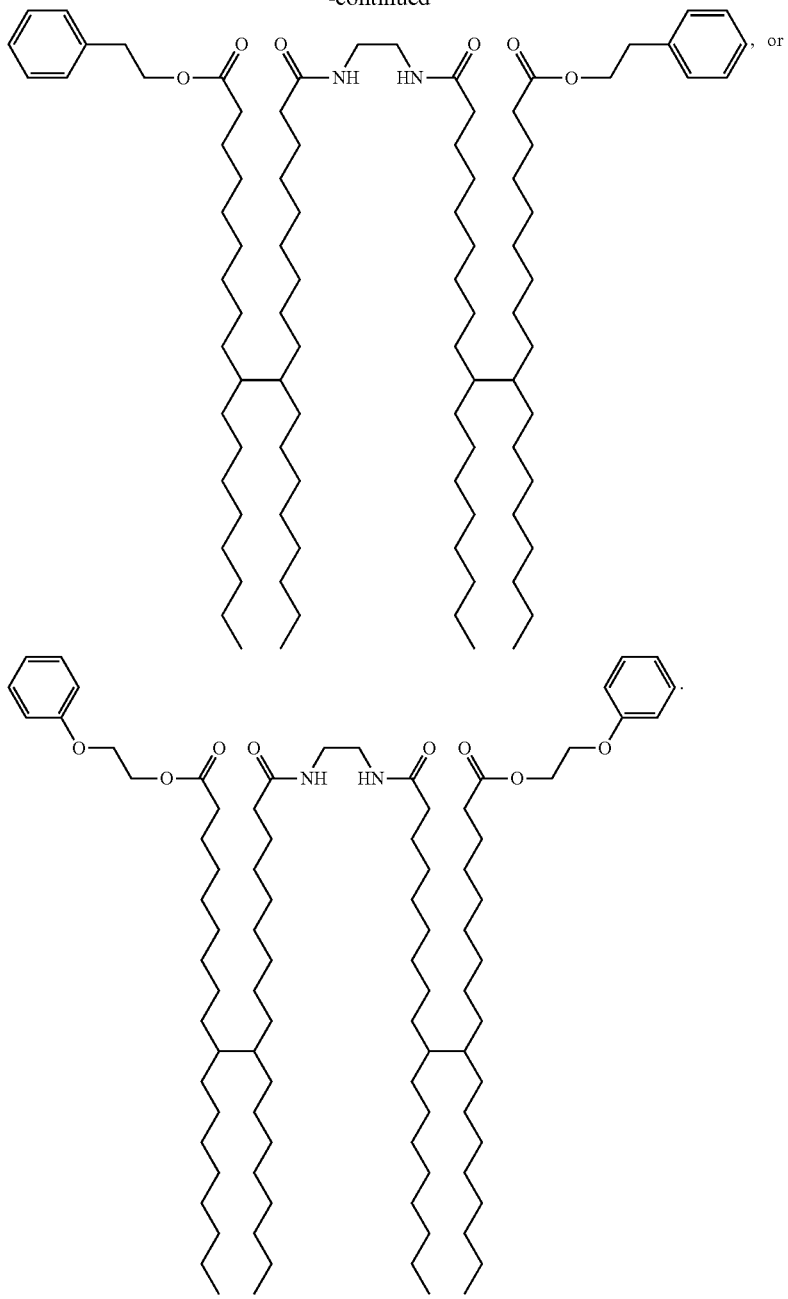

As mentioned above, the solid build ink can include the optional gelling agent, or gellant, in any suitable amount, such as about 1 percent to about 50 percent or from about 2 percent to about 20 percent or from about 5 percent to about 15 percent by weight of the ink.

The non-curable solid components of the solid build ink may include non-curable waxes including ethoxylated octylphenol derivatives, which are soluble in the ink composition and/or have a melting point of about 5° C. to about 10° C. below jetting temperatures (which may range from about 70° C. to about 100° C.) so that the non-curable waxes homogenously combine with the other components of the solid build ink composition. Furthermore, the molecular weight (MW) of ethoxylated octylphenol derivatives range from about 600 to about 5000 g/mole.

Reactants for the ethoxylated octylphenol derivatives may be selected from the Triton and IGEPAL CA series based on octylphenol ethoxylates, such as for example, IGEPAL CA-210 (equivalent to Triton X-15), IGEPAL CA-420 (equivalent to Triton X-35), IGEPAL CA-510 (equivalent to Triton X-45), IGEPAL CA-620 (equivalent to Triton X-114), IGEPAL CA-630 (equivalent to Triton X-100), IGEPAL CA-720 (equivalent to Triton X-102), IGEPAL CA-887 (equivalent to Triton X-305), IGEPAL CA-890 (equivalent to Triton X-405), IGEPAL CA-897 (equivalent to Triton X-705), as well as IGEPAL CO series (based on nonylphenol ethoxylation) such as IGEPAL CO210, IGEPAL CO520, IGEPAL C0630, IGEPAL C0720, IGEPAL C0890, and IGEPAL DM970 based on dinonylphenol ethoxylates.

The ethoxylated octylphenol derivatives may be prepared by mixing specific reactive components, for example, an ethoxylated octylphenol, a linear alcohol, and a diisocyanate and/or a polyisocyanate. These reactive components may include a linear alcohol having 38 or 30 carbons (sold under the tradename UNILIN 425); ethoxylated octylphenols, such as IGEPAL CA-210, IGEPAL CA-420, IGEPAL CA-520, IGEPAL CA-620, IGEPAL CA-630, and IGEPAL CA-720 (ethoxylated octylphenols sold under the tradename IGEPAL; formally manufactured by Rhone-Poulene Co. and currently manufactured by Rhodia; the Triton Series was formally manufactured by Union Carbide and currently manufactured by the Dow Chemical Company); diisocyanates and polyisocyanates, including aromatic, aliphatic, cycloaliphatic and/or (cyclo)aliphatic diisocyanates and/or polyisocyanates. Suitable aliphatic diisocyanates or polyisocyanates may have 3 to 16 carbon atoms or 4 to 12 carbon atoms, in the linear or branched alkyl portion, and suitable cycloaliphatic or (cyclo) aliphatic diisocyanates may possess 4 to 18 carbon atoms or 6 to 15 carbon atoms, in the cycloalkyl portion. The term "(cyclo) aliphatic diisocyanates" refers, for example, to NCO groups that are attached cyclically and aliphatically at the same time (such as isophorone diisocyanate); and cycloaliphatic diisocyanates include those which contain only NCO groups attached directly to the cycloaliphatic ring, such as $H_{12}MDI$. Suitable diisocyanates and polyisocyanates include, for example, those that are listed in U.S. patent application Ser. No. 12/704,194 to Breton et al., which is hereby incorporated by reference.

The solid build inks may be formulated using non-curable components and both commercial resin Licowax-KFO and the IGEPAL custom materials. In one embodiment, the non-curable component of the present embodiments, present in the range of 0 to 25 percent by weight in the ink, is an IGEPAL CA210 derivative or mixture of IGEPAL CA210 derivatives. Specific embodiments used the TMHDI and IPDI derivatives, melting respectively at 87° C. and 88° C.

The solid build inks may also contain a colorant. Any desired or effective colorant can be employed in the ink compositions, including dyes, pigments, mixtures thereof, and the like, provided that the colorant can be dissolved or dispersed in the ink vehicle and is compatible with the other ink components. Pigments, which are typically cheaper and more robust than dyes, may be included in the curable solid build ink. The color of many dyes can be altered by the polymerization process occurring during the curing stage, presumably from attack of their molecular structure by the free radicals. The compositions can be used in combination with conventional ink-colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN (Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (CI Solvent Black 35), Morton Morplas Magenta 36 (CI. Solvent Red 172), metal phthalocyanine colorants such as those disclosed in U.S. Pat. No. 6,221,137, the disclosure of which is incorporated herein by reference in its entirety. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the curable phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue 82001 (commercially available from Clariant); IRGALITE Blue BCA (commercially available from Ciba); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco-Yellow L1250 (commercially available from BASF); Suco-Yellow DI355 (commercially available from BASF); Suco Fast Yellow DI355, DI351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

Also suitable are the colorants disclosed in U.S. Pat. Nos. 6,472,523, 6,726,755, 6,476,219, 6,576,747, 6,713,614, 6,663,703, 6,755,902, 6,590,082, 6,696,552, 6,576,748, 6,646,111, 6,673,139, 6,958,406, 6,821,327, 7,053,227, 7,381,831 and 7,427,323, the disclosures of each of which are incorporated herein by reference in their entirety.

In embodiments, solvent dyes may be employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

The colorant may be present in the solid build ink in any desired or effective amount to obtain the desired color or hue such as, for example, at least from about 0.1 percent by weight of the ink to about 30 percent by weight of the ink, or from at least from about 0.2 percent by weight of the ink to about 20 percent by weight of the ink, or at least from about 0.5 percent by weight of the ink to about 10 percent by weight of the ink.

The curable solid build ink may optionally include an initiator, such as, for example, a photoinitiator. Such an initiator is desirable for assisting in curing of the solid build ink. In embodiments, a photoinitiator that absorbs radiation, for example UV light radiation, to initiate curing of the curable components of the solid build ink. As the photoinitiator for solid build ink that are cured by free-radical polymerization, for instance, ink compositions containing acrylate groups or inks comprised of polyamides, mentioned above may be made of photoinitiators such as benzophenones, benzoin ethers, benzil ketals, α-hydroxyalkylphenones, α-alkoxyalkylphenones α-aminoalkylphenones and acylphosphine photoinitiators sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2, 4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-benzyl 2-dimethylamino 1-(4-morpholinophenyl)butanone-1 (available as Ciba IRGACURE 369); 2-hydroxy-1-(4-(4-(2-hydroxy-2-methylpropionyl)-benzyl)-phenyl)-2-methylpropan-1-one(available as Ciba IRGACURE 127); 2-dimethylamino-2-(4-methylbenzyl)-1-(4-morpholin-4-ylphenyl)-butanone(available as Ciba IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl)phosphine oxide; 2,4,6-trimethylbenzoylphenylphosphinic acid ethyl ester; oligo(2-hydroxy-2-methy-1-(4-(1-methylvinyl)phenyl)propanone); 2-hydroxy-2-methyl-1-phenyl-1-propanone; benzyl-dimethylketal; and mixtures thereof. Amine synergists may also be employed, which are described as co-initiators that donate a hydrogen atom to a photoinitiator and thereby form a radical species that initiates polymerization (amine synergists can also consume oxygen dissolved in the ink—as oxygen inhibits free-radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the free-radical reaction upon exposure to a desired wavelength of radiation such as UV light can be used without limitation.

The photoinitiator may absorb radiation of about 200 to about 420 nm wavelengths in order to initiate cure, although use of initiators that absorb at longer wavelengths, such as the titanocenes that may absorb up to 560 nm, can also be used without restriction. The total amount of initiator included in the solid build ink may be from, for example, about 0.5 to about 15% by weight, such as from about 1 to about 10% by weight, of the ink composition. In embodiments, the curing speed of each build ink is not only dependent on the selected photoinitiator for each build ink but also on the ratio of curable and non-curable wax in the ink.

In specific embodiments, the curable monomers may be present in the solid build ink in an amount of from about 50 to about 95 percent, or from about 60 to about 90 percent by weight of the total weight of the curable solid ink. The curable wax may be present in the solid build ink in an amount of from about 0.1 to about 30 percent of the total weight of the curable solid ink. The optional gellant may be present in the curable solid ink in an amount of from about 1 to about 30 percent, or from about 5 to about 10 percent by weight of the total weight of the curable solid ink. In a specific embodiment, the gellant is present in the curable solid ink in an amount of about 7 percent by weight of the total weight of the curable solid ink. The colorant may be present in the curable solid ink in an amount of from about 0.1 to about 10 percent, or from about 1 to about 5 percent by weight of the total weight of the curable solid ink. The photoinitiator may be present in the curable solid ink in an amount of from about 0.5 to about 15 percent, or from about 1 to about 10 percent by weight of the total weight of the curable solid ink.

In embodiments, each solid build ink has a different initial hardness for each of the plurality of colors.

In embodiments, the plurality of colors comprises cyan, magenta, yellow, and black. In embodiments, when the color is cyan or black, the weight ratio of the non-curable wax to curable wax is in a range from about 2:1 to about 5:1, or from about 3:1 to about 4.5:1. In embodiments, when the color is yellow or magenta, the weight ratio of the non-curable wax to curable wax is in a range from about 0.5:1 to about 4:1, or from about 1:1 to about 3:1.

The amount and type of photoinitiators in each of the colored waxes may also be adjusted to achieve a comparable final hardness. In embodiments, the total amount of the mixture of photoinitiators is between about 4 to about 15 weight percent, with the yellow ink containing from about 4 to about 10 weight percent and the cyan, magenta and black ink containing from about 7 to about 15 weight percent.

In embodiments, a thickness of a layer before curing is a maximum in a range from about 10 microns to about 5 mm. In embodiments, each of build ink has an initial hardness in a range from about 5 to about 60 units, or about 10 to about 50, or about 20 to about 50 units. In embodiments, each build ink has an initial slope representing the initial curing rate in a range from about 25 to about 300 units, or about 100 to about 300 units, or about 150 to 300 units.

In embodiments, there are provided methods of color 3D printing comprising providing a solid build ink for each of a plurality of colors, each solid build ink comprising a solid acrylate in an amount from about 40 to about 70 percent by weight, a non-curable wax in an amount from about 10 to about 45 percent, a curable wax in an amount from about 1 to about 15 percent; a photoinitiator; and a colorant, wherein each solid build ink has an initial curing speed adjusted by a ratio of the non-curable wax to curable wax such that the curing speed and final hardness of each solid build ink is approximately the same for each of the plurality of colors, providing a support material comprising the non-curable wax used in each build ink, the support material providing a scaffold for deposition of each build ink, depositing one or more solid build inks in a plurality of layers to form a three-dimensional article on a substrate, curing each of the plurality of layers, and supporting one or more of the plurality of layers with the support material.

In embodiments, a thickness of one of the plurality of layers before curing is a maximum in a range from about 10 microns to about 5 mm. In embodiments, methods may further comprise removing the support material after completing the three-dimensional article. In embodiments, the removing step comprises washing, melting or physically removing the support material.

In embodiments, methods further comprise blending two or more build inks to form a new color prior to depositing a layer using the blended build inks. Whether employing single inks or blends/mixtures of inks, embodiments herein encompass inks having substantially the same initial cure rate and final hardness. As used herein, "substantially the same" in connection with initial cure rate and/or final hardness means within about 10% of each other, or within about 5% of each other, or within about 2% of each other, or within about 1% of each other.

In embodiments, the depositing step employs an inkjet printer. In embodiments, the curing step comprises UV irradiation.

In embodiments, there are provided three-dimensional articles made by the methods disclosed herein. In embodiments, a three dimensionally printed article described herein comprises a plurality of layers of the solid build ink, wherein the layers of the solid build ink are deposited according to data in a computer readable format. Moreover, one or more of the deposited layers of solid build ink may be supported by the support material described herein. The support material may be removed to complete production of the three-dimensionally printed article or object.

In another aspect, methods of printing a three-dimensional article or object are described herein. In embodiments, a method of printing a three-dimensional article comprises selectively depositing layers of solid build inks to form the three-dimensional article on a substrate, the solid build inks being available in a variety of colors, and optionally supporting one or more of the solid build ink layers with the support material, the support material comprising a non-curable wax component.

In embodiments, a method of printing a three-dimensional article comprises selectively depositing layers of solid build inks, available in a variety of colors, to form the three-dimensional article on a substrate, and supporting one or more of the solid build ink layers with a support material, the support material comprising a non-curable wax component and optionally a viscosity modifying component.

In some embodiments, a method of printing a three-dimensional article further comprises curing the solid build ink. This may be done at any stage, including at each individual build ink layer or any combination of layers, including one cure step of the fully formed three-dimensional object. In embodiments, a method of printing a three-dimensional article further comprises subjecting the build ink to electromagnetic radiation of sufficient wavelength and intensity to cure the build material. In embodiments for printing a three-dimensional article, a layer of deposited solid build ink may be cured prior to the deposition of another or adjacent layer of build material.

In embodiments, a pre-selected amount of solid build ink may be heated to the appropriate temperature and jetted through a print head or a plurality of print heads of a suitable inkjet printer to form a layer onto a support platform in a build chamber. Each layer of build ink may be deposited according to the preselected CAD parameters. A suitable print head to deposit the build material may include a piezoelectric Z850 print head available from Xerox Corporation, OR. Additional suitable print heads for the deposition of build and support materials described herein are commercially available from a variety of ink jet printing apparatus manufacturers. For example, the Taipan print head available from Xerox or Ricoh print heads may also be used.

In embodiments, the temperature of the build environment can be controlled so that the jetted droplets of solid build ink solidify on contact with the receiving surface, in other embodiments, the jetted droplets of build material do not solidify on contact with the receiving surface, remaining in a semi-fluid state. In some embodiments, after each layer is deposited, the deposited material may be optionally planarized and cured with electromagnetic (e.g., UV) radiation prior to the deposition of the next layer. Optionally, several layers can be deposited before optional planarization and curing, or multiple layers can be deposited and cured followed by one or more layers being deposited and then optionally planarized without curing. Planarization may be used to correct the thickness of one or more layers prior to curing the solid build ink by evening the dispensed material to remove excess material and create a uniformly smooth exposed or flat up-facing surface on the support platform of the printer. In embodiments, planarization may be accomplished with a wiper device, such as a roller, which may be counter-rotating in one or more printing directions but not counter-rotating in one or more other printing directions. In embodiments, the wiper device comprises a roller and a wiper that removes excess material from the roller. In embodiments, the wiper device may be heated. The process is continued until a useful finished three-dimensional design is prepared. It should be noted that the consistency of the jetted solid build ink of the prior to curing may be sufficient to retain its shape and not be subject to excessive viscous drag from the planarizer. In embodiments, the consistency and accuracy of the jetted solid build ink may be sufficient to obviate the need for planarization.

In embodiments, the support material can be deposited in a manner consistent with that described herein for the solid build ink. The support material, for example, can be deposited according to the preselected CAD parameters such that the support material is adjacent or continuous with one or more layers of the build material. Jetted droplets of the support material may solidify or freeze on contact with the receiving surface. In some embodiments, the deposited support material is also optionally subjected to planarization.

Layered deposition of the solid build ink and support material can be repeated until the three-dimensional article has been formed. In some embodiments, a method of printing a three-dimensional article further comprises removing the support material from the build material. As support materials described herein may be water dispersible and/or at least partially water soluble, removing the support material from the build material, in some embodiments, comprises dispersing the support material in water. Dispersing the support material in water, in some embodiments, comprises contacting the support material with flowing water. In some embodiments, dispersing the support material in water comprises at least partially immersing the three-dimensionally printed article in a water bath. In some embodiments, the water bath is stirred during immersion of the three-dimensionally printed article. In other embodiments, solvents other than water may be used to wash away the support material, such as acetone, methanol, ethanol, 1-propanol, 2-propanol, 2-butanol, methyl ethyl ketone, methyl isobutyl ketone, and mixture thereof.

In some embodiments, one or more surfactants or detergents can be added to water used to remove the support material from the build material. Additionally, in some embodiments, the support material can be subjected to mechanical agitation. In some embodiments, mechanical agitation of the support material is administered by contacting the support material with flowing or jetted water. In some embodiments, the support material can be subjected to ultrasonic agitation to remove the support material from the build material, in some embodiments, the support material can be subjected to a combination of mechanical and ultrasonic agitation to remove the support material from the cured build ink.

In embodiments, there are provided sets of solid build inks for use in color three-dimensional printing, each of the set of solid build inks comprising a solid acrylate in an amount from about 40 to about 50 percent by weight, a non-curable wax in an amount from about 30 to about 40 percent, a curable wax in an amount from about 5 to about 10 percent, a photoinitiator, and a colorant, wherein each solid build ink in the set has a different colorant and has a curing speed adjusted by a ratio of the non-curable wax to curable wax such that the curing speed and final hardness of each solid build ink is approximately the same independent of the colorant in a given solid build ink.

Those skilled in the art will readily be able to apply the teachings and guidance provided herein to generate new ink designs with a set of desired properties. Thus, in some embodiments, there are provided methods of designing a target ink having a desired initial cure rate and desired final hardness comprising selecting at least one ink from a plurality of established ink designs (such as the established designs in FIG. 3), the at least one ink having an initial cure rate and final hardness proximal to the desired cure rate and final hardness and predicting a modification to at least a ratio of a curable wax to non-curable wax in the at least one ink to provide the target ink. Other potential modifications may be dependent on the selection of a particular colorant and/or photo initiator.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

This Example describes for formation of exemplary solid build inks and characterization of some of their physical properties.

Dyed Ink formulations were prepared as follows: Into a 30 mL amber glass bottle, was added 2.019 g CD406, 1.007 g SR368, 2.843 g CD587, all available from Sartomer Company Inc. 0.825 g Unilin 350 Acrylate, an acrylate curable monofunctional acrylate wax C22, C23, C24 mixture of melting point between 50 and 60° C., 2.528 g Licowax KFO, an ester wax available from Clariant, 0.155 g Irgacure 819, 0.224 g Irgacure 184, and 0.100 g Irgacure 907, all available from Ciba Specialty Chemicals. To this mixture was added a stir bar and the mixture was placed in a Variomag reaction block. The ink mixture was heated and stirred at 90° C., and 300 RPM respectively for at least 20 minutes or until the mixture appeared homogeneous. The temperature was increased to 100° C. for five minutes before 0.300 g Blue Olefin Dye was added. The mixture was brought back down to 90° C. and left to stir for 1.5 hours, at which point the mixture appeared homogeneous.

Pigmented ink formulations were prepared as follows: Into a 30 mL amber glass bottle, was added 2.019 g CD406, 1.007 g SR368, 2.843 g CD587, 0.825 g Unilin 350 Acrylate, 2.528 g Licowax KFO, 0.155 g Irgacure 819, 0.224 g Irgacure 184, and 0.100 g Irgacure 907. To this mixture was added a stir bar and the mixture was placed in a Variomag reaction block. The ink mixture was heated and stirred at about 90° C., and 300 RPM respectively for at least 20 minutes or until mixture appears homogeneous. The temperature was increased to 100° C. for about five minutes after which time 0.300 g Microlith Magenta Pigment was added. The mixture was brought back down to 90° C. and left to stir overnight (16 hours), at which point the mixture appeared homogeneous.

Ink formulations were prepared as follows: Into a 30 mL amber glass bottle was added 2.019 g CD406, 1.007 g SR368, 2.843 g CD587, 0.825 g Unilin 350 Acrylate, 2.528 g Licowax KFO, 0.155 g Irgacure 819, 0.224 g Irgacure 184, and 0.100 g Irgacure 907. To this mixture was added a stir bar and the mixture was placed in a Variomag reaction block. The ink mixture was heated and stirred at 90° C., and 300RPM respectively for at least 20 minutes or until the mixture appeared homogeneous. The temperature was increased to 100° C. for about five minutes and left to stir for ten minutes.

Other examples of curable solid build inks that may fall within the parameters disclosed herein are described in U.S.

Patent Application Nos. 2012/0287212, 2012/0287199, and 2012/0274699, each of which is incorporated herein by reference in their entirety.

Specific examples of curable solid build inks suitable for three-dimensional printing processes are shown in the Table 1 below. Formulations O1 to O3 were chosen to cover a range of curing properties while still being homogeneous as well as having the correct viscosity at jetting temperature.

TABLE 1

| Component | O1 | O2 | O3 | L1 |
|---|---|---|---|---|
| Monomer | | | | |
| CD406 | 31.105 | 28.861 | 20.600 | 20.394 |
| SR368 | 0 | 2.244 | 10.250 | 10.172 |
| CD587 | 17.581 | 17.581 | 29.010 | 28.724 |
| Curable Wax | | | | |
| Unilin 350 acrylate | 8.330 | 8.330 | 8.330 | 8.330 |
| Non-curable wax | | | | |
| Licowax KFO | 36.142 | 0 | 0 | 25.539 |
| Igepal A | 0 | 36.142 | 24.970 | 0 |
| Photoinitiator | | | | |
| Irgacure 819 | 1.568 | 1.568 | 1.570 | 1.570 |
| Irgacure 184 | 2.264 | 2.264 | 2.260 | 2.258 |
| Irgacure 907 | 1.009 | 1.009 | 1.010 | 1.013 |
| Colorant | | | | |
| Blue Olefin Dye | 2.00 | 2.00 | 2.00 | 2.00 |
| TOTAL | 100 | 100 | 100 | 100 |

Figure 2:
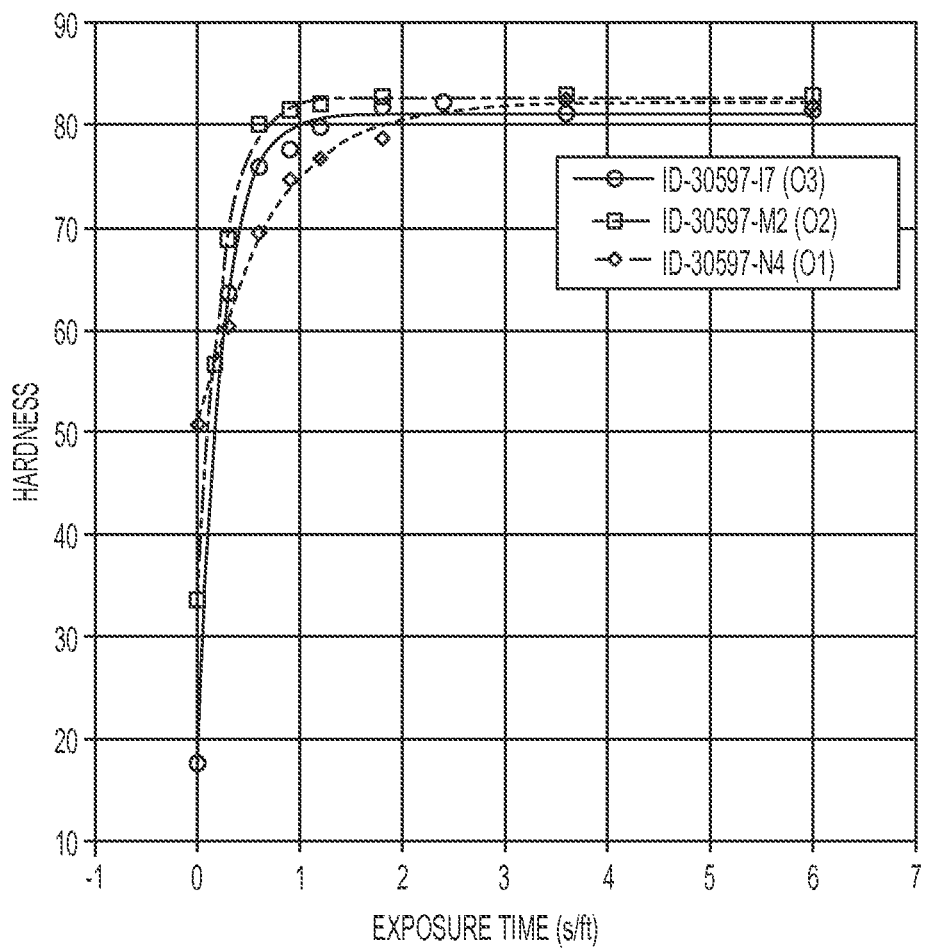
FIG. 2 shows a plot of the curing profile of the exemplary solid build inks of FIG. 1 prior to addition of colorant.

Rheological profiles for inks of invention are shown in FIG. 1. The inks are Newtonian in temperature range from about 80° C. to about 90° C. Curing profiles of analogous formulations without colorants was also obtained as indicated in FIG. 2 and in Table 2 below. Note, for simplicity the data was generated without colorant to provide convenient comparison of formulations without regard to the impact of the colorant. One skilled in the art will recognize, however, that the one can include a colorant and determine an optimum photoinitiator package for each of the color and compare them at this optimum.

The data in Table 2 was extracted from fitting data of FIG. 2 using the relationship:

$$y = m_1 + m_2 \cdot (1 - \exp(-m_3 \cdot x))$$

Initial Hardness = $m_1$

Initial Slope = $m_2 \cdot m_3$

Final Hardness = $m_1 + m_2$

TABLE 2

| Predicted Properties (Analogous formulations with no colorant) | | | |
|---|---|---|---|
| Initial Hardness | 50.4 | 33.5 | 17.8 |
| Final Hardness | 82.3 | 82.9 | 81.4 |
| Initial Slope | 46 | 214 | 280 |

Numerous curable solid build inks were formulated to define the design space for printing. While fast curing rates are useful for conventional printing processes where initial hardness is below about 20, the solid build inks disclosed herein have an initial hardness generally above about 30 with initial slope above about 25. In embodiments, the initial hardness may be lower but in such cases, the materials should have a very high curing rate, such as an initial slope of more than about 200.

Figure 3:
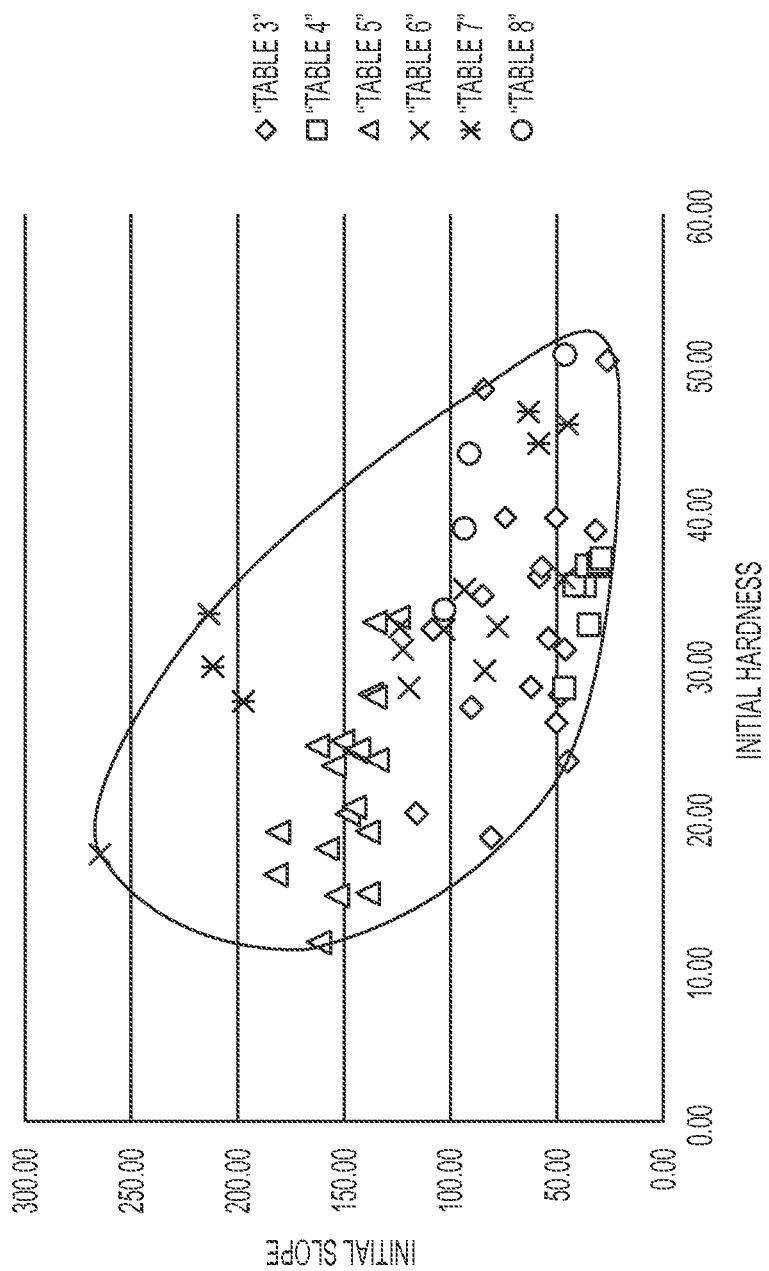
FIG. 3 shows a plot of initial slope versus initial hardness for a variety of solid build inks in accordance with embodiments herein.

FIG. 3 shows a plot of initial slope versus initial hardness for a variety of solid build inks prepared in accordance with embodiments herein. The upper right quadrant represents a beneficial operating location for materials, that is, fastest initial curing rate (initial slope) or highest initial hardness. For 3D object printing, a lower initial hardness is acceptable provided it is high enough to prevent flow at ambient temperature within timeframe of building the object. The following tabulated series of inks exemplify 3D formulations in accordance with embodiments herein and were used to generate the data shown in FIG. 3.

TABLE 3

| | Ink # | | | | | | | | | |
|---|---|---|---|---|---|---|---|---|---|---|
| | 1 | 2 | 3 | 4 | 5 | 6 | 7 | 8 | 9 | 10 |
| CD406 | 2.00 | 2.00 | 4.74 | 3.34 | 2.74 | 6.00 | 6.00 | 2.00 | 2.00 | 3.57 |
| SR368 | 1.44 | 2.10 | 0.70 | 2.10 | 0.70 | 1.44 | 0.70 | 2.10 | 2.10 | 1.25 |
| CD587 | 4.00 | 3.34 | 0.00 | 0.00 | 4.00 | 0.00 | 0.00 | 1.34 | 1.34 | 1.57 |
| Unilin 350 acrylate | 0.00 | 0.00 | 0.00 | 2.00 | 0.00 | 0.00 | 0.74 | 2.00 | 0.00 | 0.53 |
| Licowax KFO | 2.00 | 2.00 | 4.00 | 2.00 | 2.00 | 2.00 | 2.00 | 2.00 | 4.00 | 2.53 |
| ITX | 0.05 | 0.05 | 0.05 | 0.05 | 0.05 | 0.05 | 0.05 | 0.05 | 0.05 | 0.05 |
| Irgacure 907 | 0.51 | 0.51 | 0.51 | 0.51 | 0.51 | 0.51 | 0.51 | 0.51 | 0.51 | 0.51 |
| Total | 10.0 | 10.0 | 10.0 | 10.0 | 10.0 | 10.0 | 10.0 | 10.0 | 10.0 | 10.0 |

| | Ink # | | | | | | | | | |
|---|---|---|---|---|---|---|---|---|---|---|
| | 11 | 12 | 13 | 14 | 15 | 16 | 17 | 18 | 19 | 20 |
| CD406 | 2.00 | 3.57 | 2.00 | 2.00 | 2.00 | 6.00 | 5.34 | 4.74 | 3.34 | 6.00 |
| SR368 | 0.70 | 1.25 | 0.70 | 0.70 | 0.70 | 0.70 | 2.10 | 0.70 | 2.10 | 0.70 |
| CD587 | 2.74 | 1.57 | 4.00 | 2.74 | 4.00 | 0.74 | 0.00 | 0.00 | 0.00 | 0.00 |
| Unilin 350 acrylate | 2.00 | 0.53 | 0.00 | 0.00 | 0.74 | 0.00 | 0.00 | 2.00 | 0.00 | 0.00 |

TABLE 3-continued

| | | | | | | | | | |
|---|---|---|---|---|---|---|---|---|---|
| Licowax KFO | 2.000 | 2.527 | 2.740 | 4.000 | 2.000 | 2.000 | 2.000 | 2.000 | 4.000 | 2.740 |
| ITX | 0.05 | 0.05 | 0.05 | 0.05 | 0.05 | 0.05 | 0.05 | 0.05 | 0.05 | 0.05 |
| Irgacure 907 | 0.51 | 0.51 | 0.51 | 0.51 | 0.51 | 0.51 | 0.51 | 0.51 | 0.51 | 0.51 |
| Total | 10.0 | 10.0 | 10.0 | 10.0 | 10.0 | 10.0 | 10.0 | 10.0 | 10.0 | 10.0 |

TABLE 4

| | Ink # | | | | | | | |
|---|---|---|---|---|---|---|---|---|
| | 21 | 22 | 23 | 24 | 25 | 26 | 27 | 28 |
| Monomer | | | | | | | | |
| CD406 | 2.000 | 2.000 | 2.000 | 2.010 | 2.901 | 2.000 | 2.000 | 2.010 |
| SR368 | 1.025 | 1.025 | 1.025 | 1.030 | 1.600 | 1.025 | 1.025 | 1.030 |
| CD587 | 3.037 | 3.037 | 3.037 | 3.052 | 2.563 | 3.037 | 3.037 | 3.052 |
| Curable Wax | | | | | | | | |
| Unilin 350 acrylate | 0.806 | 0.806 | 0.806 | 0.810 | 0.374 | 0.806 | 0.806 | 0.810 |
| Oligomer | | | | | | | | |
| CN2255 | 0.000 | 0.000 | 0.000 | 0.000 | 0.000 | 0.077 | 0.000 | 0.000 |
| CN2256 | 0.000 | 0.000 | 0.000 | 0.000 | 0.000 | 0.000 | 0.077 | 0.000 |
| Non-Curable Wax | | | | | | | | |
| LicoWax KFO | 2.570 | 2.570 | 2.570 | 2.583 | 2.000 | 2.493 | 2.493 | 2.583 |
| Photoinitiator | | | | | | | | |
| Darocur ITX | 0.050 | 0.050 | 0.050 | 0.050 | 0.050 | 0.050 | 0.050 | 0.000 |
| Irgacure 907 | 0.510 | 0.510 | 0.510 | 0.513 | 0.510 | 0.510 | 0.510 | 0.513 |
| Total | 10.00 | 10.00 | 10.00 | 10.05 | 10.00 | 10.00 | 10.00 | 10.00 |

TABLE 5

| | Ink # | | | | | | | | | |
|---|---|---|---|---|---|---|---|---|---|---|
| | 29 | 30 | 31 | 32 | 33 | 34 | 35 | 36 | 37 | 38 |
| Monomer | | | | | | | | | | |
| CD406 | 2.08 | 2.08 | 2.08 | 2.08 | 2.08 | 2.08 | 2.08 | 2.08 | 2.08 | 2.08 |
| SR368 | 1.04 | 1.04 | 1.04 | 1.04 | 1.04 | 1.04 | 1.04 | 1.04 | 1.04 | 1.04 |
| CD587 | 2.93 | 2.93 | 2.93 | 2.93 | 2.93 | 2.93 | 2.93 | 2.93 | 2.93 | 2.93 |
| Curable Wax | | | | | | | | | | |
| Unlin 350 acrylate | 0.85 | 0.85 | 0.85 | 0.85 | 0.85 | 0.85 | 0.85 | 0.85 | 0.85 | 0.85 |
| Non-Curable Wax | | | | | | | | | | |
| Licowax KFO | 1.60 | 1.70 | 1.60 | 1.80 | 1.94 | 2.70 | 2.20 | 1.60 | 2.30 | 2.10 |
| Photoinitiator | | | | | | | | | | |
| Irgacure 819 | 0.30 | 0.30 | 0.10 | 0.10 | 0.19 | 0.10 | 0.10 | 0.30 | 0.10 | 0.30 |
| Irgacure 184 | 0.10 | 0.50 | 0.30 | 0.50 | 0.31 | 0.10 | 0.10 | 0.50 | 0.10 | 0.10 |
| Irgacure 379 | 0.50 | 0.50 | 0.50 | 0.10 | 0.31 | 0.10 | 0.10 | 0.50 | 0.50 | 0.50 |
| Irgacure 907 | 0.60 | 0.10 | 0.60 | 0.60 | 0.34 | 0.10 | 0.60 | 0.20 | 0.10 | 0.10 |
| Total | 10.0 | 10.0 | 10.0 | 10.0 | 10.0 | 10.0 | 10.0 | 10.0 | 10.0 | 10.0 |

| | Ink # | | | | | | | | |
|---|---|---|---|---|---|---|---|---|---|
| | 11 | 12 | 13 | 14 | 15 | 16 | 17 | 18 | 19 |
| Monomer | | | | | | | | | |
| CD406 | 2.08 | 2.08 | 2.08 | 2.08 | 2.08 | 2.08 | 2.08 | 2.08 | 2.08 |
| SR368 | 1.04 | 1.04 | 1.04 | 1.04 | 1.04 | 1.04 | 1.04 | 1.04 | 1.04 |
| CD587 | 2.93 | 2.93 | 2.93 | 2.93 | 2.93 | 2.93 | 2.93 | 2.93 | 2.93 |

TABLE 5-continued

| Curable Wax | | | | | | | | | |
|---|---|---|---|---|---|---|---|---|---|
| Unlin 350 acrylate | 0.85 | 0.85 | 0.85 | 0.85 | 0.85 | 0.85 | 0.85 | 0.85 | 0.85 |
| Non-Curable Wax | | | | | | | | | |
| Licowax KFO | 1.60 | 1.80 | 2.00 | 2.10 | 1.60 | 2.30 | 1.90 | 2.50 | 1.60 |
| Photoinitiator | | | | | | | | | |
| Irgacure 819 | 0.10 | 0.10 | 0.30 | 0.30 | 0.10 | 0.10 | 0.10 | 0.30 | 0.30 |
| Irgacure 184 | 0.50 | 0.10 | 0.10 | 0.50 | 0.50 | 0.50 | 0.50 | 0.10 | 0.50 |
| Irgacure 379 | 0.30 | 0.50 | 0.10 | 0.10 | 0.50 | 0.10 | 0.50 | 0.10 | 0.10 |
| Irgacure 907 | 0.60 | 0.60 | 0.60 | 0.10 | 0.40 | 0.10 | 0.10 | 0.10 | 0.60 |
| Total | 10.0 | 10.0 | 10.0 | 10.0 | 10.0 | 10.0 | 10.0 | 10.0 | 10.0 |

TABLE 6

| | Ink # | | | | | | | | |
|---|---|---|---|---|---|---|---|---|---|
| | 39 | 40 | 41 | 42 | 43 | 44 | 45 | 46 | 47 |
| Monomer | | | | | | | | | |
| CD406 | 2.081 | 2.081 | 2.081 | 2.081 | 2.081 | 2.081 | 2.081 | 2.081 | 2.010 |
| SR368 | 1.038 | 1.038 | 1.038 | 1.038 | 1.038 | 1.038 | 1.038 | 1.038 | 1.030 |
| CD587 | 2.931 | 2.931 | 2.931 | 2.931 | 2.931 | 2.931 | 2.931 | 2.931 | 3.052 |
| Curable Wax | | | | | | | | | |
| Unilin 350 acrylate | 0.850 | 0.850 | 0.850 | 0.850 | 0.850 | 0.850 | 0.850 | 0.850 | 0.810 |
| Licowax KFO | 2.522 | 2.606 | 2.606 | 2.655 | 2.717 | 2.522 | 0.000 | 2.217 | 2.326 |
| Photoinitiator | | | | | | | | | |
| Irgacure 819 | 0.155 | 0.160 | 0.160 | 0.000 | 0.167 | 0.000 | 0.155 | 0.100 | 0.000 |
| Irgacure 184 | 0.223 | 0.230 | 0.230 | 0.235 | 0.000 | 0.581 | 0.223 | 0.353 | 0.000 |
| Irgacure 907 | 0.100 | 0.103 | 0.000 | 0.105 | 0.108 | 0.000 | 0.100 | 0.330 | 0.513 |
| Total | 10.00 | 10.00 | 10.00 | 10.00 | 10.00 | 10.00 | 10.00 | 10.00 | 10.00 |

TABLE 7

| | Ink # | | | | | |
|---|---|---|---|---|---|---|
| | 48 | 49 | 50 | 51 | 52 | 53 |
| Monomer | | | | | | |
| CD406 | 2.945 | 2.945 | 2.945 | 2.442 | 3.234 | 2.945 |
| SR368 | 0.229 | 0.229 | 0.229 | 0.319 | 0.251 | 0.229 |
| CD587 | 1.794 | 1.794 | 1.794 | 2.501 | 1.970 | 1.794 |
| Curable Wax | | | | | | |
| Unilin 350 acrylate | 0.850 | 0.850 | 0.850 | 1.185 | 0.000 | 0.850 |
| Non-Curable Wax | | | | | | |
| Licowax KFO | 3.688 | 0.000 | 0.000 | 0.000 | 4.050 | 2.889 |
| Igepal A | 0.000 | 3.688 | 0.000 | 3.058 | 0.000 | 0.800 |
| Igepal D | 0.000 | 0.000 | 3.688 | 0.000 | 0.000 | 0.000 |
| Photoinitiator | | | | | | |
| Irgacure 819 | 0.160 | 0.160 | 0.160 | 0.160 | 0.160 | 0.160 |
| Irgacure 184 | 0.231 | 0.231 | 0.231 | 0.231 | 0.231 | 0.231 |
| Irgacure 907 | 0.103 | 0.103 | 0.103 | 0.103 | 0.103 | 0.103 |
| Total | 10.00 | 10.00 | 10.00 | 10.00 | 10.00 | 10.00 |

TABLE 8

| | Ink # | | | |
|---|---|---|---|---|
| | 54 | 55 | 56 | 57 |
| Monomer | | | | |
| CD406 | 2.234 | 2.234 | 2.234 | 3.174 |
| SR368 | 0.174 | 0.174 | 0.174 | 0.000 |
| CD587 | 1.361 | 1.361 | 1.361 | 1.794 |
| Curable Wax | | | | |
| Unilin 350 acrylate | 0.850 | 0.850 | 0.850 | 0.850 |
| Non-Curable Wax | | | | |
| Licowax KFO | 0.000 | 0.000 | 0.000 | 3.688 |
| Igepal A | 4.888 | 0.000 | 4.088 | 0.000 |
| Igepal D | 0.000 | 4.888 | 0.000 | 0.000 |
| Amide Gellant | 0.000 | 0.000 | 0.800 | 0.000 |
| Photoinitiator | | | | |
| Irgacure 819 | 0.160 | 0.160 | 0.160 | 0.160 |
| Irgacure 184 | 0.231 | 0.231 | 0.231 | 0.231 |
| Irgacure 907 | 0.103 | 0.103 | 0.103 | 0.103 |
| Total | 10.00 | 10.00 | 10.00 | 10.00 |

Each of the inks included in Table 3 to Table 8 were evaluated using the same method that was used for the inks of Table 1, thus generating "initial slope" (initial curing rate) and "initial hardness" data for each of them. The data was then plotted (FIG. 3) to help define the formulation design latitude/space. This is visually represented by the curved solid line encompassing the data points in FIG. 3. Based on the results one can predict inks with properties intermediate to those shown in Table 3 and such inks can be formulated by changing the ratio of the existing ink components. Inks with intermediate properties can also be generated by combining compositions whose data points are in close proximity to one another (see FIG. 3). Thus, it becomes possible to adjust the formulations of an ink set so that all colors will have approximately the same initial hardness and curing rate. Optionally, this approach can be used to formulate building materials that have different starting initial properties and different cured properties, thus generating parts that have controlled curing profiles. This may be useful, for example, when the surface of a part is required to be different from the bulk of the part or when individual sections of the part of a printed object need to have different initial curing properties to allow post-processing.

What is claimed is:

1. A color three-dimensional (3D) printing system comprising:
   a solid build ink for each of a plurality of colors, each solid build ink comprising:
      a solid acrylate in an amount from about 40 to about 70 percent by weight;
      a non-curable wax in an amount from about 10 to about 45 percent by weight;
      a curable wax in an amount from about 1 to about 15 percent by weight;
      a photoinitiator; and
      a colorant;
         wherein each solid build ink has a curing speed adjusted by a ratio of the non-curable wax to curable wax such that the initial curing speed and final hardness of each solid build ink is approximately the same for each of the plurality of colors; and
   a support material comprising the non-curable wax used in each build ink, the support material providing a scaffold for deposition of each build ink.

2. The system of claim 1, wherein each solid build ink has a different initial hardness for each of the plurality of colors.

3. The system of claim 1, wherein the curing speed of each build ink is partially independent of the selected photoinitiator for each build ink.

4. The system of claim 1, wherein the plurality of colors comprises cyan, magenta, yellow, and black.

5. The system of claim 1, wherein when the color is cyan, the ratio of the non-curable wax to curable wax is in a range from about 2:1 to about 5:1.

6. The system of claim 1, wherein when the color is black, the ratio of the non-curable wax to curable wax is in a range from about 2:1 to about 5:1.

7. The system of claim 1, wherein when the color is yellow, the ratio of the non-curable wax to curable wax is in a range from about 0.5:1 to about 4:1.

8. The system of claim 1, wherein when the color is magenta, the ratio of the non-curable wax to curable wax is in a range from about 0.5:1 to about 4:1.

9. The system of claim 1, wherein a thickness of a layer before curing is a maximum in a range from about 10 microns to about 5 mm.

10. The system of claim 1, wherein each of build ink has an initial hardness in a range from about 5 to about 60 units.

11. The system of claim 1, wherein each build ink has an initial slope, the slope corresponding to curing speed, in a range from about 25 to about 300.

12. A method of color 3D printing a three-dimensional article comprising:
    providing a solid build ink for each of a plurality of colors, each solid build ink comprising:
       a solid acrylate in an amount from about 40 to about 70 percent by weight;
       a non-curable wax in an amount from about 10 to about 45 percent by weight;
       a curable wax in an amount from about 1 to about 15 percent by weight;
       a photoinitiator; and
       a colorant;
          wherein each solid build ink has a curing speed adjusted by a ratio of the non-curable wax to curable wax such that the curing speed and final hardness of each solid build ink is approximately the same for each of the plurality of colors;
    providing a support material comprising the non-curable wax used in each build ink, the support material providing one or more scaffold layers for deposition of at least one solid build ink layer as dictated by the geometry of the three-dimensional article;
    depositing one or more solid build inks in a plurality of build ink layers to form the three-dimensional article on a substrate, each deposited build ink layer of the plurality of build ink layers being disposed on (1) the substrate; (2) a portion of a previous solid build ink layer; (3) a portion of the one or more scaffold layers, or combinations thereof;
    depositing the support material in the one or more scaffold layers, each deposited scaffold layer being disposed on (1) the substrate; (2) a portion of a previous solid build ink layer; (3) a portion of the one or more scaffold layers, or combinations thereof; and
    curing each of the plurality of build ink layers to form the three-dimensional article.

13. The method of claim 12, wherein a thickness of one of the plurality of layers before curing is a maximum in a range from about 10 microns to about 5 mm.

14. The method of claim 12, further comprising removing the support material after completing the three-dimensional article.

15. The method of claim 14, wherein the removing step comprises washing, melting or physically removing the support material.

16. The method of claim 12, further comprising blending two or more build inks to form a new color prior to depositing a layer using the blended build inks.

17. The method of claim 12, wherein the depositing step employs an inkjet printer.

18. The method of claim 12, wherein the curing step comprises UV irradiation.

19. A three-dimensional article made by the method of claim 12, wherein the article comprises a support material comprising the non-curable wax used in each build ink, the support material providing one or more scaffold layers for deposition of at least one solid build ink layer as dictated by the geometry of the three-dimensional article and one or more build ink layers forming the three-dimensional article on a substrate, each deposited build ink layer of the plurality of build ink layers being disposed on (1) the substrate; (2) a portion of a previous solid build ink layer; (3) a portion of the one or more scaffold layers, or combinations thereof.

* * * * *